US012621586B2

(12) United States Patent
Geurts

(10) Patent No.: US 12,621,586 B2
(45) Date of Patent: May 5, 2026

(54) MULTI-STORAGE GATED IMAGING SYSTEM

(71) Applicant: OMNIVISION TECHNOLOGIES, INC., Santa Clara, CA (US)

(72) Inventor: Tomas Geurts, Parkstraat (BE)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 381 days.

(21) Appl. No.: 18/349,014

(22) Filed: Jul. 7, 2023

(65) Prior Publication Data

US 2025/0016474 A1 Jan. 9, 2025

(51) Int. Cl.
| | |
|---|---|
| *H04N 25/771* | (2023.01) |
| *H04N 23/56* | (2023.01) |
| *H04N 25/53* | (2023.01) |
| *H04N 25/78* | (2023.01) |

(52) U.S. Cl.
CPC ........... *H04N 25/771* (2023.01); *H04N 23/56* (2023.01); *H04N 25/53* (2023.01); *H04N 25/78* (2023.01)

(58) Field of Classification Search
CPC ...... H04N 25/771; H04N 23/56; H04N 25/53; H04N 25/78; H04N 25/633; H04N 25/59
See application file for complete search history.

(56) References Cited

U.S. PATENT DOCUMENTS

| | | | | |
|---|---|---|---|---|
| 5,446,529 A * | 8/1995 | Stettner | ..................... | G01T 1/28 |
| | | | | 250/332 |
| 8,587,637 B1 * | 11/2013 | Cryder | .................... | G01S 17/89 |
| | | | | 348/46 |
| 9,699,442 B2 | 7/2017 | Fereyre et al. | | |
| 9,723,233 B2 | 8/2017 | Grauer et al. | | |
| 11,496,700 B1 * | 11/2022 | Elizov | .................. | H04N 25/771 |
| 2015/0144790 A1 * | 5/2015 | Velichko | ............... | G01S 7/4816 |
| | | | | 250/338.4 |
| 2016/0150165 A1 * | 5/2016 | Grauer | ................... | H04N 25/58 |
| | | | | 348/308 |
| 2022/0035038 A1 * | 2/2022 | Oh | ......................... | H04N 23/56 |

* cited by examiner

*Primary Examiner* — Nhan T Tran
(74) *Attorney, Agent, or Firm* — Dorsey & Whitney LLP

(57) ABSTRACT

A gated imaging system includes a pulsed illuminator configured to generate a plurality of light pulses and a pixel circuit. The pixel circuit includes a photodiode configured to collect photogenerated image charge in response to incident light, a floating diffusion coupled to receive the image charge from the photodiode, a sense node amplifier includes a gate terminal coupled to the floating diffusion, and a storage network coupled between the photodiode and the floating diffusion. The storage network includes a plurality of memory nodes coupled between the photodiode and the floating diffusion in parallel. The storage network is configured to capture a plurality of depth slices between two successive ones of the light pulses.

24 Claims, 6 Drawing Sheets

MULTI-STORAGE GATED IMAGING SYSTEM

TECHNICAL FIELD

This disclosure relates generally to image sensors, and in particular but not exclusively, relates to complementary metal oxide semiconductor (CMOS) image sensors.

BACKGROUND

Image sensors have become ubiquitous and are now widely used in digital cameras, cellular phones, security cameras, as well as in medical, automotive, and other applications. As image sensors are integrated into a broader range of electronic devices, it is desirable to enhance their functionality, performance metrics, and the like in as many ways as possible (e.g., resolution, power consumption, dynamic range) through both device architecture design as well as image acquisition processing. The technology used to manufacture image sensors has continued to advance at a great pace. For example, the demands of higher resolution and lower power consumption have encouraged the further miniaturization and integration of these devices.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to produce digital images (e.g., image data) representing the external scene. The analog image signals on the bitlines are coupled to readout circuits, which include input stages having analog-to-digital conversion (ADC) circuits to convert those analog image signals from the pixel array into the digital image signals.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
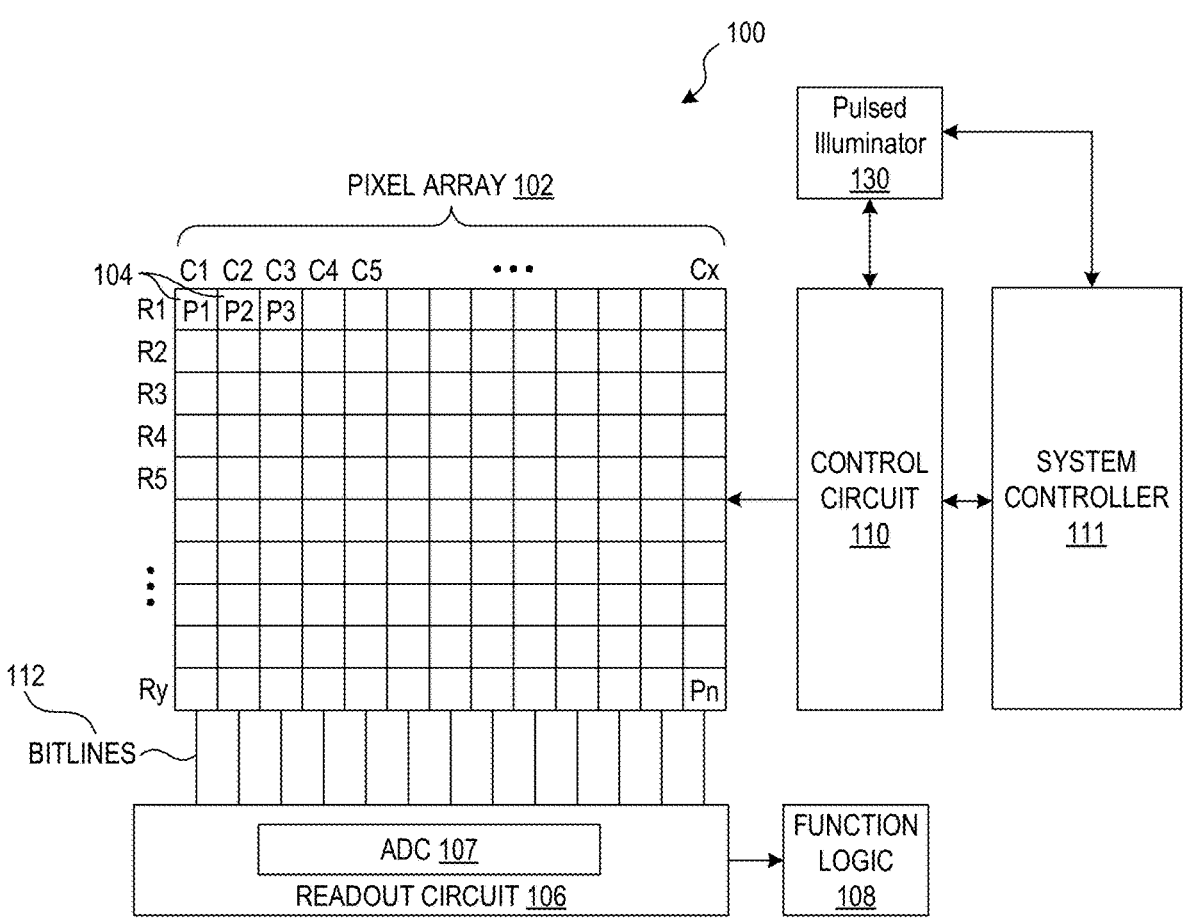
FIG. 1 illustrates one example of an imaging system in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure.

DETAILED DESCRIPTION

Examples directed to a gated imaging system with pixel circuits providing improved gated integration are disclosed. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present disclosure. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of a gated imaging system with pixel circuits providing improved gated integration are disclosed. A gated imaging system includes a pulsed illuminator that illuminates a target object or scene with light pulses, and an electronic gate or shutter that controls the return light exposure to pixels. Gated integration involves accumulating multiple return light pulses from specific distances, creating slices with information from specific ranges ("depth slices"), timing a shutter pulse relative to an illuminator pulse, and using the time it takes for light to travel each of the distances. In various examples, each frame can include thousands of dynamic and variable depth slices, which can be added to form a frame. By precisely timing the gate or shutter to capture only the light that has been reflected or scattered back from the target object or scene, a gated imaging system can eliminate noise and interference caused by ambient light or other sources. A gated imaging system can be particularly useful to capture images in fog, rain, and darkness.

It is appreciated that a gated imaging system in accordance with the teachings of the present disclosure can capture and accumulate multiple depth slices before reading them out, reducing the time delay between depth slices for the same frame and minimizing blur. A gated imaging system in accordance with the teachings of the present disclosure can also capture and read out multiple depth slices between successive light pulses, resulting in less power consumption by the pulsed illuminator. Additionally, a gated imaging system in accordance with the teachings of the present disclosure can include multiple storage components, each of which can store a different depth slice and prevent mixing information.

Thus, as will be shown and described in the various examples below, an example gated imaging system includes a pulsed illuminator configured to generate a plurality of light pulses, and a pixel array including a plurality of pixel circuits. Each pixel circuit includes a photodiode configured to collect photogenerated image charges in response to incident light, a floating diffusion coupled to receive the image charges from the photodiode, a sense node amplifier coupled to the floating diffusion, and a storage network coupled between the photodiode and the floating diffusion. The storage network is configured to capture a plurality of depth slices between two successive ones of the light pulses.

To illustrate, FIG. 1 shows one example of an imaging system 100 having a readout circuit 106 in accordance with the teachings of the present disclosure. In particular, the example depicted in FIG. 1 illustrates an imaging system 100 that includes a pixel array 102, bitlines 112, a control circuit 110, a system controller 111, a readout circuit 106, function logic 108, and a pulsed illuminator and controller 130. In one example, pixel array 102 is a two-dimensional (2D) array including a plurality of pixel circuits 104 (e.g., P1, P2, . . . , Pn) that are arranged into rows (e.g., R1 to Ry) and columns (e.g., C1 to Cx) to acquire image data of a person, place, object, etc., which can then be used to render an image of a person, place, object, etc.

In various examples, the readout circuit 106 may be configured to read out the image signals through the column bitlines 112. As will be discussed, in the various examples, readout circuit 106 may include an analog-to-digital converter (ADC) 107 in accordance with the teachings of the present disclosure. In the example, the digital image data values generated by the analog to digital converters in readout circuit 106 may then be received by function logic 108. Function logic 108 may simply store the digital image data or even manipulate the digital image data by applying post image effects (e.g., crop, rotate, remove red eye, adjust brightness, adjust contrast, or otherwise).

In one example, control circuit 110 is coupled to pixel array 102 to control operation of the plurality of photodiodes in pixel array 102. For example, control circuit 110 may generate a rolling shutter or a shutter signal for controlling image acquisition. In other examples, image acquisition is synchronized with lighting effects such as a flash. Control circuit 110 and/or system controller 111 may control operation of the pulsed illuminator and controller 130, which is configured to generated light pulses.

In one example, imaging system 100 may be included in a digital camera, cell phone, laptop computer, an endoscope, a security camera, or an imaging device for automobile, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2A:
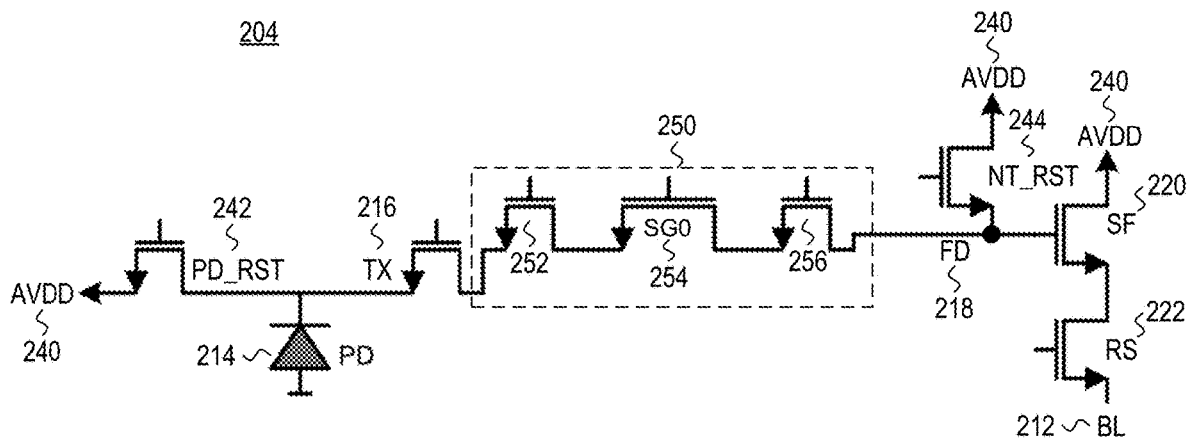
FIGS. 2A and 2B illustrate schematics of example single-storage pixel circuits in accordance with the teachings of the present disclosure.
Figure 2B:
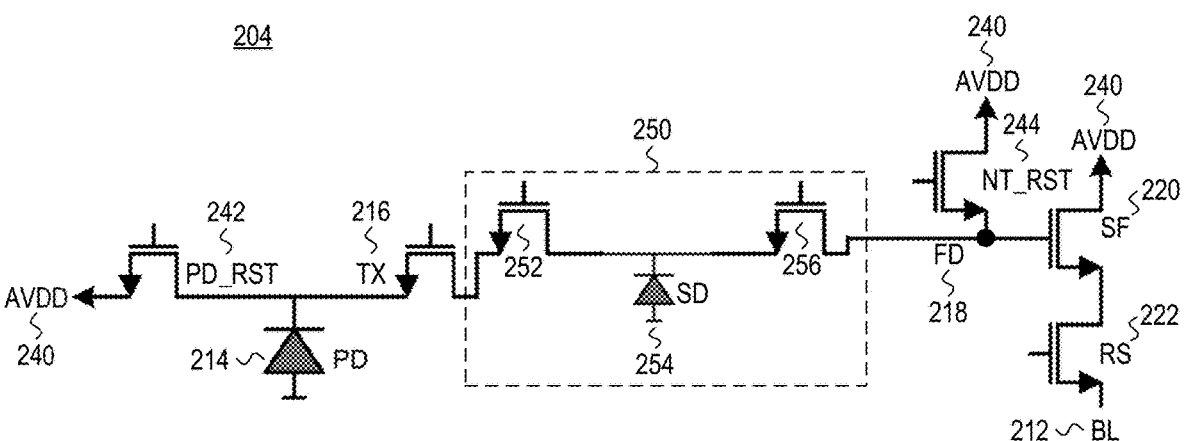

FIGS. 2A and 2B illustrate schematics of example single-storage pixel circuits 204 in accordance with the teachings of the present disclosure. It is appreciated that the pixel circuits 204 of FIGS. 2A and 2B may be examples of the pixel circuits 104 included in the imaging system 100 as shown in FIG. 1, and that similarly named and numbered elements described above are coupled and function similarly below.

Referring to both FIGS. 2A and 2B, the pixel circuit 204 includes a photodiode 214 configured to collect photogenerated image charges in response to incident light, a floating diffusion 218 coupled to receive the image charges from the photodiode 214, a transfer transistor 216 coupled between the photodiode 214 and the floating diffusion 218 to transfer the image charges from the photodiode 214 to the floating diffusion 218, and a photodiode reset transistor 242 coupled between the photodiode 214 and a voltage source AVDD 240. The pixel circuit 204 also includes a sense node amplifier 220 (e.g., a source follower transistor having a gate terminal) coupled to the floating diffusion 218 and coupled to the voltage source AVDD 240 and a row select transistor 222 coupled between the sense node amplifier 220 (e.g., a source terminal of a source follower transistor) and a bitline 212.

The pixel circuit 204 further includes a storage network 250 coupled between the transfer transistor 216 and the floating diffusion 218, and a network reset transistor 244 coupled between the floating diffusion 218 and the voltage source AVDD 240. In the illustrated example, the storage network 250 includes a first depth slice transistor 252, a memory node 254, and a second depth slice transistor 256 coupled in series between the transfer transistor 216 and the floating diffusion 218. In various examples, the memory node 254 can be a pinned memory node. In FIG. 2A, the memory node 254 is represented as a third depth slice transistor configured as a storage gate SG0. In FIG. 2B, the memory node 254 is represented as a storage diode SD. The memory node 254 can comprise other devices or structures for storage.

In various examples, the storage network 250 is configured to capture a plurality of depth slices between two successive light pulses generated by a pulsed illuminator (e.g., the pulsed illuminator 130 illustrated in FIG. 1). In particular, the first and second depth slice transistors 252, 256 and the memory node 254 can be configured to allow image charges to flow to a storage component, such as the memory node 254 coupled between the first and second depth slice storage transistors 252, 256. In various examples, it is appreciated that one or more of the first and second depth slice storage transistors 252, 256 and the memory node 254 may be omitted and/or one or more additional devices or structures (e.g., transistors, diodes) may be added. For instance, in one example, the first depth slice storage transistor 252 may be omitted. Furthermore, in various examples, any one or more of the illustrated components (e.g., the transfer transistor 216) may be omitted.

In various examples, the photodiode reset transistor 242 is configured to reset the photodiode 214 each time the storage network 250 captures one or more of the depth slices. A readout circuit (e.g., the readout circuit 106) coupled to the pixel circuit 204 can be configured to read out the depth slices during a readout period after the storage network 250 captures the depth slices. In various examples, the network reset transistor 244 is configured to reset the storage network 250 at an end of the readout period.

Figure 3A:
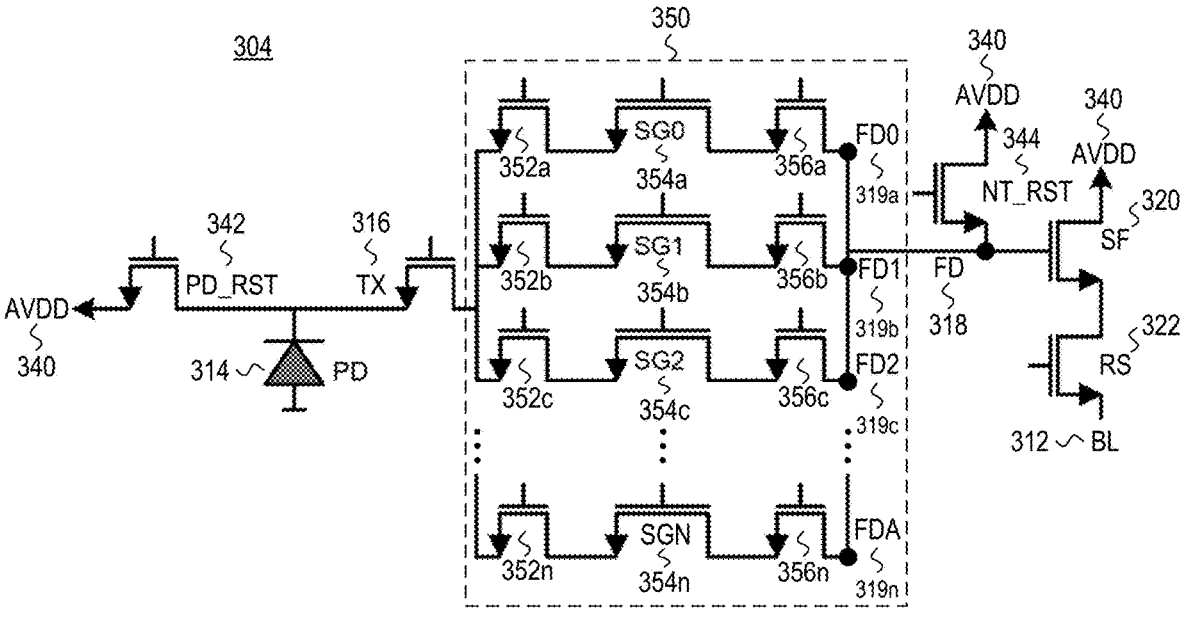
FIGS. 3A and 3B illustrate schematic of other example multi-storage pixel circuits in accordance with the teachings of the present disclosure.
Figure 3B:
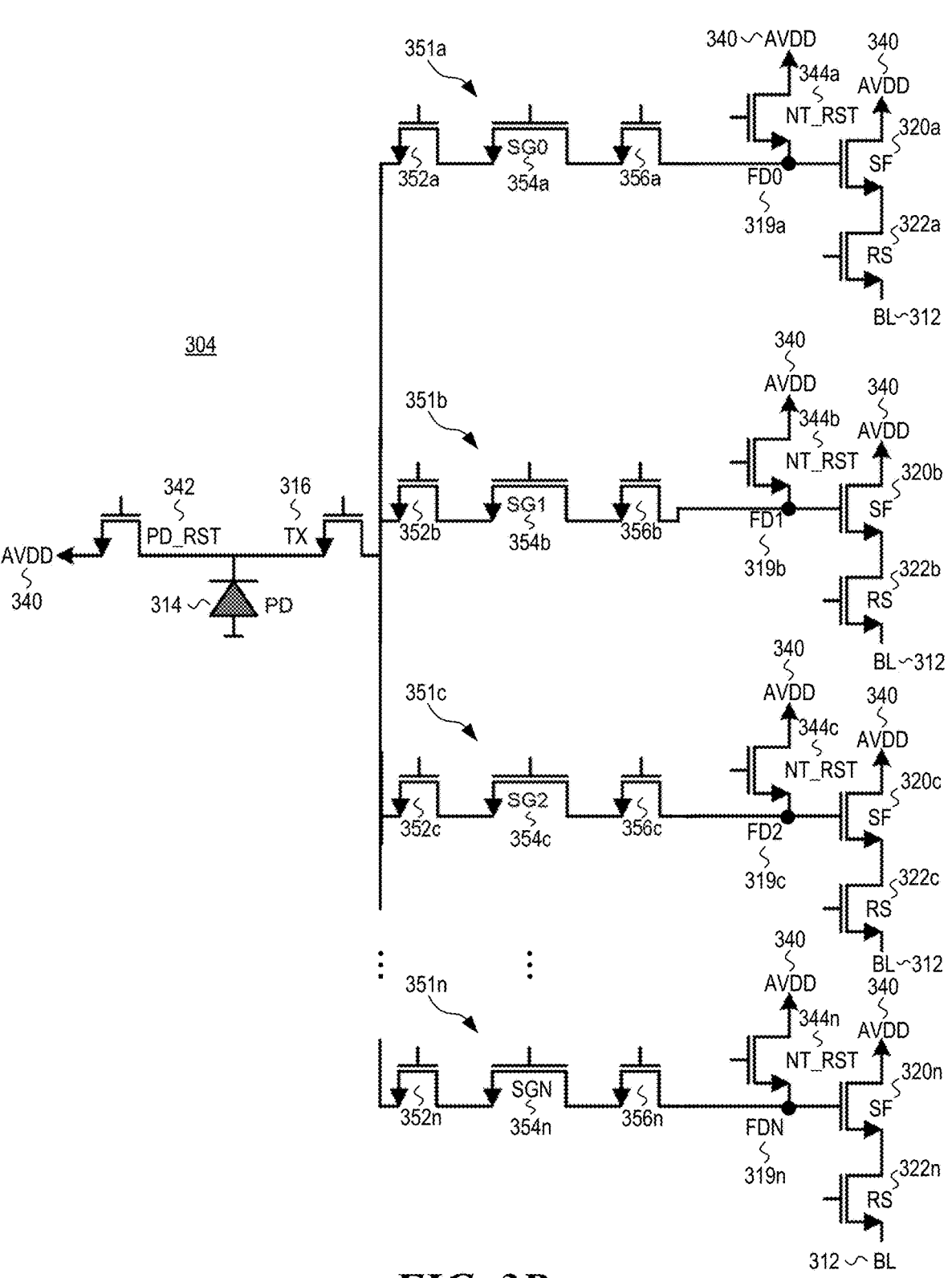

FIGS. 3A and 3B illustrate schematics of other example multi-storage pixel circuits 304 in accordance with the teachings of the present disclosure. It is appreciated that the pixel circuits 304 of FIGS. 3A and 3B may be other examples of one of the pixel circuits 104 included in the imaging system 100 as shown in FIG. 1, and that similarly named and numbered elements described above are coupled and function similarly below.

Referring first to FIG. 3A, the illustrated pixel circuit 304 includes a photodiode 314 configured to collect photogenerated image charges in response to incident light, a floating diffusion 318 coupled to receive the image charges from the photodiode 314, a transfer transistor 316 coupled between the photodiode 314 and the floating diffusion 318 to transfer the image charges from the photodiode 314 to the floating diffusion 318, and a photodiode reset transistor 342 coupled between the photodiode 314 and a voltage source AVDD 340. The pixel circuit 304 also includes a sense node amplifier 320 (e.g., a source follower transistor having a gate terminal) coupled to the floating diffusion 318 and coupled to the voltage source AVDD 340, and a row select transistor 322 coupled between the sense node amplifier 320 (e.g., a source terminal of a source follower transistor) and a bitline 312.

The pixel circuit 304 further includes a storage network 350 coupled between the transfer transistor 316 and the floating diffusion 318, and a network reset transistor 344 coupled between the floating diffusion 318 and the voltage source AVDD 340. In the illustrated example, the storage network 350 includes a plurality of first depth slice transistors 352a/b/c . . . n, a plurality of second depth slice transistors 356a/b/c . . . n, and a plurality of memory nodes 354a/b/c . . . n coupled between the transfer transistor 316 and the floating diffusion 318. While each memory node 354 is illustrated as a transistor (e.g., storage gate SG0/1/2 . . . N) in FIG. 3A, in various examples, one or more of the memory nodes 354a/b/c . . . n can be storage diodes, as illustrated in FIG. 2B. In various examples, one or more of the memory nodes 354a/b/c . . . n can be pinned memory nodes. In various examples, one or more of the first and second depth slice storage transistors 352, 356 and the memory nodes 354 may be omitted. For instance, in one example, the first depth slice storage transistors 352a/b/c . . . n may be omitted. Furthermore, in various examples, any one or more of the illustrated components (e.g., the transfer transistor 316) may be omitted. In various examples, the floating diffusion 318 includes a plurality of floating diffusion portions FD0 319a, FD1 319b, FD2 319c, . . . , FDA 319n, and each floating diffusion portion 319a/b/c . . . n of floating diffusion 318 can be coupled to a corresponding one of the depth slice transistors 356a/b/c . . . n, as shown.

In various examples, the storage network 350 is configured to capture a plurality of depth slices between two successive light pulses generated by a pulsed illuminator (e.g., the pulsed illuminator 130 illustrated in FIG. 1). In particular, the depth slice transistors 352, 356 and the memory nodes 354 can be configured to allow image charges to flow to corresponding storage components, such as the memory nodes 354 (which, in the depicted example, are configured as storage gates, e.g., SG0/SG1/SG2/etc.) coupled between the respective first and second depth slice transistors 352 and 356.

Referring next to FIG. 3B, the illustrated pixel circuit 304 includes a photodiode 314 configured to collect photogenerated image charges in response to incident light, a photodiode reset transistor 342 coupled between the photodiode 314 and a voltage source AVDD 340, a transfer transistor 316 coupled to the photodiode 314, and a plurality of depth slice storage circuits 351a/b/c/etc. In the illustrated embodiment, each depth slice storage circuit 351 includes a floating diffusion FD0/1/2/etc. 319a/b/c . . . n coupled to receive the image charges from the photodiode 314, a first depth slice transistor 352a/b/c . . . n, a memory node 354a/b/c . . . n, and a second depth slice transistor 356a/b/c . . . n coupled between the photodiode 314 and the floating diffusion 319a/b/c . . . n.

Each depth slice storage circuit 351 can further include a network reset transistor 344 a/b/c . . . n coupled between the floating diffusion 319a/b/c . . . n and the voltage source AVDD 340, a sense node amplifier 320a/b/c . . . n (e.g., a source follower transistor with a gate terminal) coupled to the floating diffusion 319a/b/c . . . n, and a row select transistor 322a/b/c . . . n coupled between the sense node amplifier 320a/b/c . . . n (e.g., a source terminal of a source follower transistor) and a bitline 312. In some embodiments, each depth slice storage circuit 351 is coupled to a unique bitline 312. In some embodiments, some or all of the depth slice storage circuits 351 are coupled to the same bitline 312.

Similar to the embodiment illustrated in FIG. 3A, the depth slice storage circuits 351 can be configured to capture a plurality of depth slices between two successive light pulses generated by a pulsed illuminator (e.g., the pulsed illuminator 130 illustrated in FIG. 1). In particular, the depth slice transistors 352, 356 and the memory nodes 354 can be configured to allow image charges to flow to corresponding storage components, such as the memory nodes 354 (which, in the depicted example, are configured as storage gates, e.g., SG0/SG1/SG2 . . . SGN) coupled between the respective first and second depth slice transistors 352 and 356.

While each memory node 354 is illustrated as a transistor (e.g., storage gate SG0/1/2 . . . N) in FIG. 3A, in various examples, one or more of the memory nodes 354 a/b/c . . . n can be storage diodes, as illustrated in FIG. 2B. In various examples, one or more of the memory nodes 354a/b/c . . . n can be pinned memory nodes. In various examples, one or more of the first and second depth slice storage transistors 352, 356 and the memory nodes 354 may be omitted. For instance, in one example, the first depth slice storage transistors 352a/b/c . . . n may be omitted. Furthermore, in various examples, any one or more of the illustrated components (e.g., the transfer transistor 316) may be omitted.

In various examples, the photodiode reset transistor 342 is configured to reset the photodiode 314 each time the storage network 350 or a depth slice storage circuit 351 captures one or more of the depth slices. A readout circuit (e.g., the readout circuit 106) coupled to the pixel circuit 304 can be configured to read out the depth slices during a readout period after the storage network 350 or a depth slice storage circuit 351 captures the depth slices between two successive light pulses. In various examples, the network reset transistor 344 is configured to reset the depth slice transistors 352, 356 and the memory nodes 354 at an end of the readout period.

Referring to FIGS. 3A and 3B together, in various examples, one or more of the depth slice transistors 352, 356 and the memory nodes 354 can be used to pass and/or store ambient light before or after capturing the depth slices. In various examples, groups of multiple, but not all of, depth slice transistors 352, 356 and/or memory nodes 354 can be configured to share a floating diffusion, a row select transistor, a sense node amplifier, and a bitline. For example, in each depth slice storage circuit 351, a floating diffusion FD 319 can be coupled to multiple memory nodes 354.

Figures 4, 5:
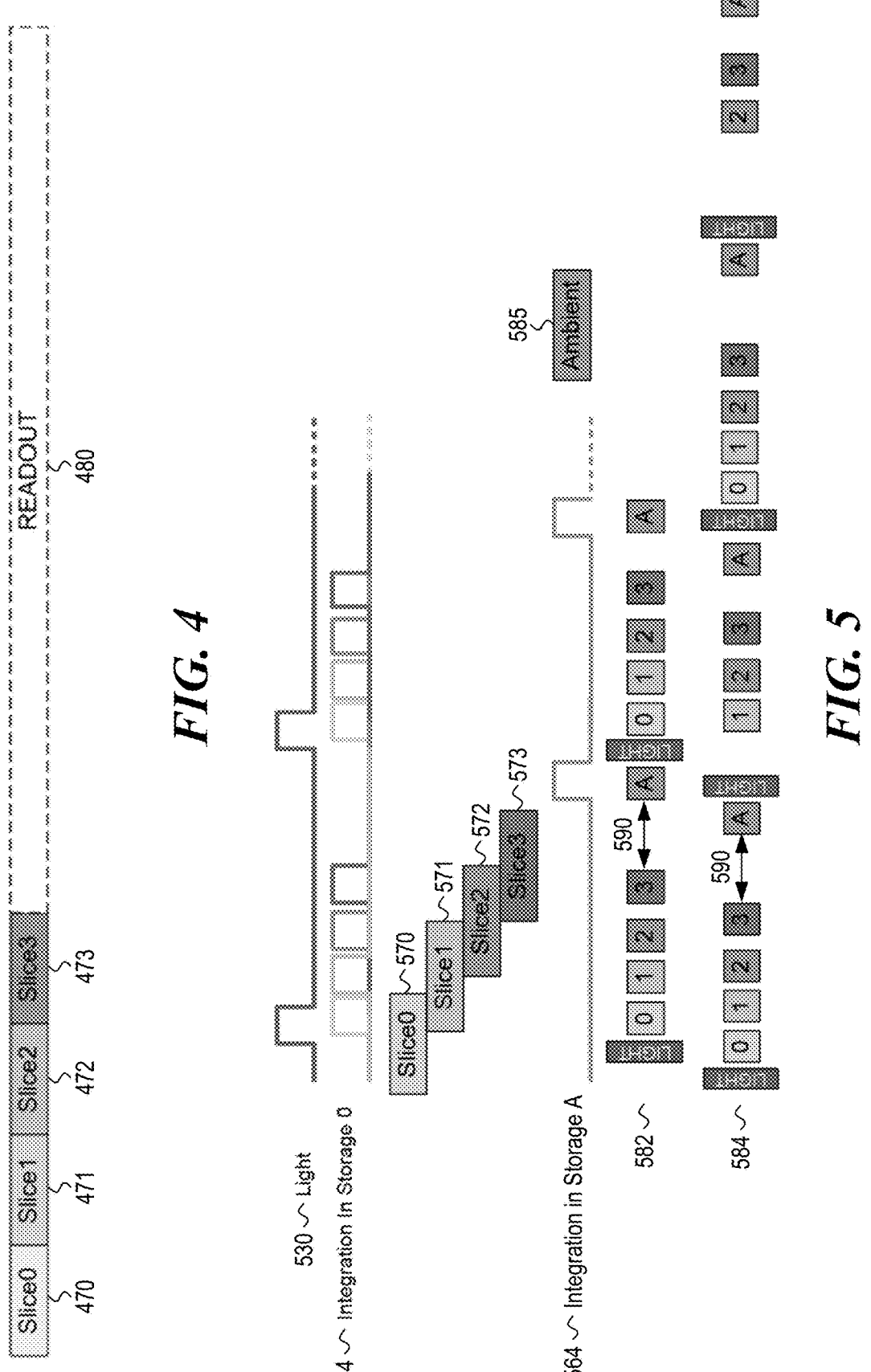
FIG. 4 illustrates a timing diagram of a gated imaging system in accordance with the teachings of the present disclosure.
FIG. 5 illustrates a timing diagram of an example single-storage pixel circuit in accordance with the teachings of the present disclosure.

FIG. 4 illustrates a timing diagram of a gated imaging system in accordance with the teachings of the present disclosure. It is appreciated that the timing diagram of FIG. 4 may be an example timing diagram of the imaging system 100 as shown in FIG. 1, and that similarly named and numbered elements described above are coupled and function similarly below.

In the illustrated example, the imaging system is configured to capture a first depth slice Slice0 470, a second depth slice Slice1 471, a third depth slice Slice2 472, and a fourth depth slice Slice3 473 prior to a readout period 480. In various examples, capturing each depth slice takes approximately 1 ms and the readout period 480 lasts between approximately 7 and 29 ms.

This is in contrast to timings of conventional imaging systems in which each depth slice is read out immediately after its capture. In conventional imaging systems, because there are time delays between the depth slices, the final image may include blur. On the other hand, imaging systems operated based on the timing diagram illustrated in FIG. 4 reduce, if not eliminate, blur by capturing the depth slices successively prior to reading them out. It is appreciated that the timing diagram can include fewer or more depth slices that are captured by the imaging system.

FIG. 5 illustrates a timing diagram of an example single-storage pixel circuit in accordance with the teachings of the present disclosure. It is appreciated that the timing diagram of FIG. 5 may be an example timing diagram of the pixel circuit 204 as shown in FIG. 2, and that similarly named and numbered elements described above are coupled and function similarly below.

A pulsed illuminator (e.g., the pulsed illuminator 130 illustrated in FIG. 1) can be configured to generate a plurality of light pulses. Two such light pulses are shown in the illustrated example. Following a rising edge of a first light pulse, a memory node (e.g., a transistor, a diode) included in a storage network of a pixel circuit (e.g., the memory node 254 included in the storage network 250 of the pixel circuit 204) can be configured to be pulsed for each of the depth slices between two successive light pulses. In the illustrated example, a first depth slice Slice0 570, a second depth slice Slice1 571, a third depth slice Slice2 572, and a fourth depth slice Slice3 573 are captured. This allows integration of image charge collected by a photodiode in response to all depth slices in a single storage component, which is depicted in FIG. 5 as Integration in Storage 0 554 (e.g., in the memory node 254).

In various examples, one of the memory nodes (e.g., one of the memory nodes 354) can be configured to be pulsed substantially long after a preceding light pulse and after the imaging system captures all depth slices, but still between the two successive light pulses. This allows integration of image charge collected by a photodiode in response to ambient light 585 in a storage component corresponding to the ambient light memory node. While the integration of pulse(s) as depicted in Integration in Storage 0 554 can overlap with the light pulses 530, as shown, the Integration in Storage 0 554 and the Integration in Storage A 564 are configured to be pulsed at non-overlapping time periods in various embodiments. In fact, in the illustrated first and second timing sequences 582, 584, there is a timing gap 590 between the final pulse of the Integration in Storage 0 554 (i.e., corresponding to the capture of the fourth depth slice Slice3 573) and the pulse of the Integration in Storage A 564. The timing gap 590 allows for a sufficient integration period for the ambient light 585, which can be used as a black level to be subtracted from the captured depth slices 570, 571, 572, 573 upon readout.

In the first timing sequence 582, which captures all depth slices between every pair of successive light pulses, after the pulse of the ambient light memory node, the cycle repeats with a new light pulse 530 (e.g., the second light pulse in the illustrated example). It is appreciated that fewer or more depth slices can be captured by the memory node. In the second timing sequence 584, one or more depth slices can be omitted intermittently. In the illustrated second timing sequence 584, no depth slice is omitted after the first light pulse, slice 0 is omitted after the second light pulse, no depth slice is omitted after the third light pulse, and both slices 0 and 1 are omitted after the fourth light pulse. In various examples, other timing sequences of omitting one or more depth slices are used.

In various examples, the photodiode of the pixel circuit operated according to the illustrated timing diagram can be configured to be reset by a photodiode reset transistor (e.g., the photodiode reset transistor 242) each time a depth slice is captured. In various examples, the storage network, which includes the depth slice storage transistor and the ambient light storage transistor, can be configured to be reset by a network reset transistor (e.g., the network reset transistor 244), at the end of a readout period.

Figure 6:
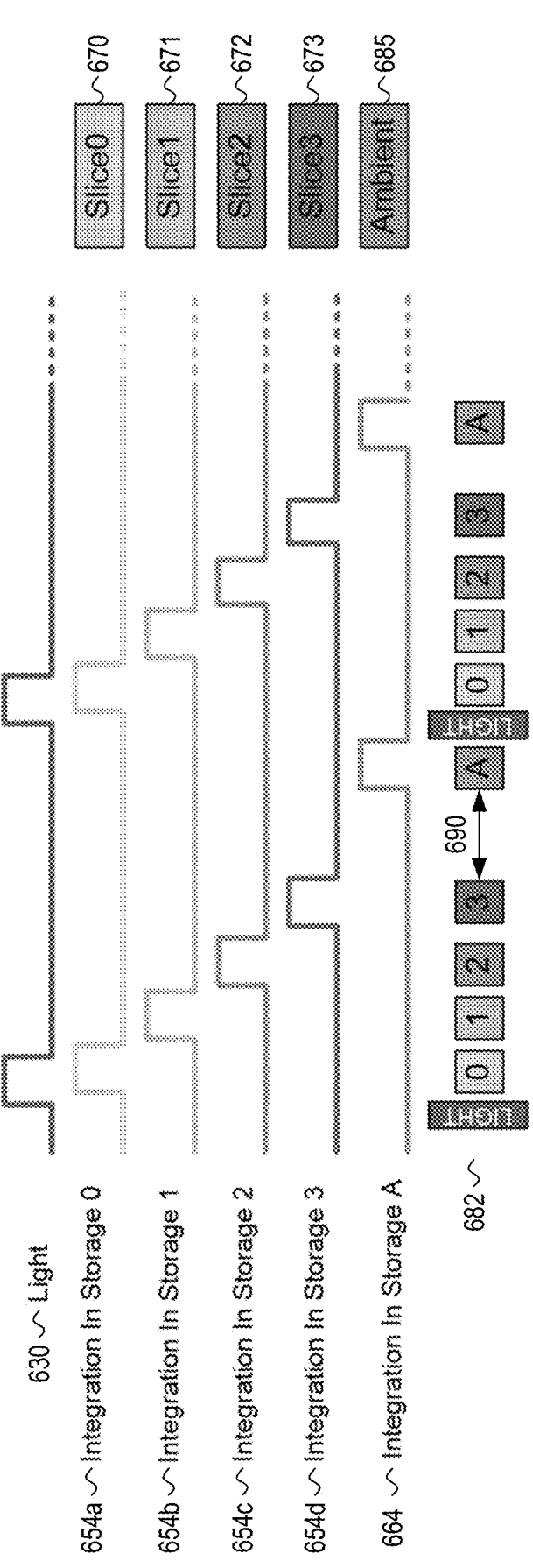
FIG. 6 illustrates a timing diagram of an example multi-storage pixel circuit in accordance with the teachings of the present disclosure.

FIG. 6 illustrates a timing diagram of an example multi-storage pixel circuit in accordance with the teachings of the present disclosure. It is appreciated that the timing diagram of FIG. 6 may be an example timing diagram of the pixel circuit 304 as shown in FIG. 3, and that similarly named and numbered elements described above are coupled and function similarly below.

A pulsed illuminator 630 (e.g., the pulsed illuminator 130 illustrated in FIG. 1) can be configured to generate a plurality of light pulses. Two such light pulses are shown in the illustrated example. Following a rising edge of a first light pulse, each of a plurality of memory nodes included in a storage network of a pixel circuit (e.g., the memory nodes 354a/b/c . . . n included in the storage network 350 of the pixel circuit 304) can be configured to be pulsed for a corresponding one of the depth slices between two successive light pulses. In the illustrated example, a first depth slice Slice0 670 is captured via a first memory node 654a, a second depth slice Slice1 671 is captured via a second memory node 654b, a third depth slice Slice2 672 is captured via a third memory node 654c, and a fourth depth slice Slice3 673 is captured via a fourth memory node 654d. This allows integration of image charge collected by a photodiode in response to each depth slice in a different storage component, which are depicted in FIG. 6 as Integration in Storage 0 654*a*, Integration in Storage 1 654*b*, Integration in Storage 2 654*c*, and Integration in Storage 3 654*d* (e.g., in the memory nodes 354*a/b/c* . . . *n*).

In various examples, one of the memory nodes (e.g., one of the memory nodes 354) can be configured to be pulsed substantially long after a preceding light pulse, and after the imaging system captures all depth slices, but still between the two successive light pulses. This allows integration of image charge collected by a photodiode in response to ambient light 685 in the ambient light memory node. While the integration of pulse(s) as depicted in Integration in Storage 0 654*a*, Integration in Storage 1 654*b*, etc. can overlap with the light pulses 630, as shown, the Integration in Storage 0 654*a*, Integration in Storage 1 654*b*, etc. and the Integration in Storage A 664 are configured to be pulsed at non-overlapping time periods in various embodiments. In fact, in the illustrated timing sequence 682, there is a timing gap 690 between the pulse of the last integration (i.e., Integration in Storage 3 654*d*), corresponding to the capture of the fourth depth slice Slice3 673) and the pulse of the Integration in Storage A 664. The timing gap 690 allows for a sufficient integration period for the ambient light 685, which can be used as a black level to be subtracted from the captured depth slices 670, 671, 672, 673 upon readout.

After the pulse of the memory node configured to integrate the charge collected by the photodiode in response to the ambient light, the cycle described above repeats with a new light pulse 630 (e.g., the second light pulse in the illustrated example). It is appreciated that fewer or more depth slice storage transistors and/or memory nodes can be used to capture fewer or more depth slices each cycle. For example, four integrations (e.g., 654*a-d*) can be pulsed between first and second light pulses 630, three integrations (e.g., 654*b-d*) can be pulsed between second and third light pulses 630, two integrations (e.g., 654*c-d*) can be pulsed between third and fourth light pulses 630, and one integration (e.g., 654*d*) can be pulsed between fourth and fifth light pulses 630. In some embodiments, the number of integrations and the timing of each integration pulse between two consecutive light pulses 630 can change between cycles randomly. In some embodiments, the number of integrations between two consecutive light pulses 630 can change between cycles in a predictable manner (e.g., linearly, exponentially, following a normal distribution, etc.).

In various examples, the photodiode of the pixel circuit operated according to the illustrated timing diagram can be configured to be reset by a photodiode reset transistor (e.g., the photodiode reset transistor 342) each time a depth slice is captured. In various examples, the storage network, which includes the depth slice storage transistor and the ambient light storage transistor, can be configured to be reset by a network reset transistor (e.g., the network reset transistor 344), at the end of a readout period.

A single-storage pixel circuit, illustrated in FIGS. 2 and 5, and a multi-storage pixel circuit, illustrated in FIGS. 3 and 6, differ in several ways. For example, a single-storage pixel circuit provides a simpler circuit design because only one memory node is required. If first and second depth slice transistors are also included for each memory node, as illustrated in FIGS. 2 and 3 (i.e., the first depth slice transistors 252/352 and the second depth slice transistors 256/356), the difference in circuit design complexity is magnified. However, because all depth slices are captured and stored in a single storage component in a single-storage pixel circuit, the information can become mixed and the depth slices can become less distinguishable. By contrast, different depth slices are captured and stored in different storage components, allowing each depth slice to be read out separately and combined at, for example, a post-processing stage.

In order for the single-storage pixel circuit to capture multiple depth slices, a readout period must be included between integrations of different depth slices, which may introduce blur in the combined image. Moreover, the same depth slice can be integrated multiple times in a single-storage pixel circuit before being read out by pulsing the light pulse for each integration. However, this can result in more light pulses (e.g., twice as many) and a longer integration and readout period (e.g., 50% longer) compared to a multi-storage pixel circuit capturing and readout the same number of depth slices.

Regardless of whether a single-storage or multi-storage pixel circuit is used, however, an imaging system in accordance with the teachings of the present disclosure provides significant power consumption reduction and blur reduction. Power consumption by a pulsed illuminator can be significant, and since the same light pulse is shared between (or "re-used" by) the capture of multiple depth slices, an imaging system in accordance with the teachings of the present disclosure can capture the same number of depth slices for less power compared to a conventional imaging system that captures and stores only one depth slice between two successive light pulses. For example, if a conventional imaging system generates 25 light pulses for a first depth slice, 50 light pulses for a second depth slice, 100 light pulses for a third depth slice, and 200 light pulses for a fourth depth slice (i.e., a total of 375 light pulses), an imaging system in accordance with the teachings of the present disclosure can capture all four depth slices with just 200 light pulses, resulting in an almost 50% power consumption reduction. Moreover, because the multiple depth slices are accumulated before readout (see FIG. 4), there is very little to no timing gap between the depth slices that can cause blur. Alternatively, the imaging system may keep the number of light pulses the same (i.e., a total of 375 light pulses in the example above), but transmit each pulse at reduced power, allowing the use of smaller and/or cheaper light sources.

The above description of illustrated examples of the disclosure, including what is described in the Abstract, is not intended to be exhaustive or to limit the disclosure to the precise forms disclosed. While specific examples of the disclosure are described herein for illustrative purposes, various modifications are possible within the scope of the disclosure, as those skilled in the relevant art will recognize.

These modifications can be made to the disclosure in light of the above detailed description. The terms used in the following claims should not be construed to limit the disclosure to the specific examples disclosed in the specification. Rather, the scope of the disclosure is to be determined entirely by the following claims, which are to be construed in accordance with established doctrines of claim interpretation.

What is claimed is:

1. A gated imaging system, comprising:
a pulsed illuminator configured to generate a plurality of light pulses; and
a pixel circuit, comprising:
a photodiode configured to collect photogenerated image charges in response to incident light,
a floating diffusion coupled to receive the image charges from the photodiode, a sense node amplifier coupled to the floating diffusion, a storage network coupled between the photodiode and the floating diffusion, the storage network comprising a plurality of memory nodes coupled between the photodiode and the floating diffusion, and a transfer transistor coupling the photodiode to each of the plurality of memory nodes, wherein the storage network is configured to capture a plurality of depth slices between two successive ones of the light pulses.

2. The gated imaging system of claim 1, wherein each of the memory nodes is configured to pulse for a corresponding one of the depth slices between the two successive ones of the light pulses.

3. The gated imaging system of claim 1, wherein individual ones of the memory nodes comprise a transistor or a diode.

4. The gated imaging system of claim 1, wherein the pixel circuit further comprises a photodiode reset transistor coupled between the photodiode and a voltage source, wherein the photodiode reset transistor is configured to reset the photodiode each time the storage network captures one of the depth slices.

5. The gated imaging system of claim 1, wherein the pixel circuit further comprises a network reset transistor coupled between the storage network and a voltage source, wherein the network reset transistor is configured to reset the storage network at an end of a readout period.

6. The gated imaging system of claim 1, further comprising a readout circuit coupled to the pixel circuits and configured to read out the depth slices after the storage network captures the depth slices between two successive ones of the light pulses.

7. The gated imaging system of claim 1, wherein the pixel circuit is one of a plurality of pixel circuits included in a pixel array.

8. The gated imaging system of claim 1, wherein the floating diffusion comprises a plurality of floating diffusion portions, wherein each floating diffusion portion is coupled to at least one of the memory nodes.

9. The gated imaging system of claim 1, wherein the sense node amplifier comprises a source follower transistor, wherein the floating diffusion is coupled to a gate terminal of the source follower transistor.

10. The gated imaging system of claim 1, wherein the transfer transistor couples the photodiode directly to each of the plurality of memory nodes.

11. The gated imaging system of claim 1, wherein:

the floating diffusion is a first floating diffusion;

the pixel circuit further comprises a second floating diffusion different from the first floating diffusion; and the storage network further comprises one or more second memory nodes coupled between the photodiode and the second floating diffusion.

12. A gated imaging system, comprising:

a pulsed illuminator configured to generate a plurality of light pulses; and a pixel circuit, comprising:

a photodiode configured to collect photogenerated image charges in response to incident light; and a plurality of depth slice storage circuits coupled to receive the photogenerated image charges from the photodiode, each depth slice storage circuit comprising:

an independent floating diffusion coupled to receive the image charges from the photodiode;

an independent sense node amplifier coupled to the independent floating diffusion;

at least one independent memory node coupled between the photodiode and the independent floating diffusion; and an independent row select transistor coupled to the independent sense node amplifier, wherein the independent row select transistors of the plurality of depth slice storage circuits couple the independent sense node amplifiers to a same bitline, and wherein the depth slice storage circuits are configured to capture a plurality of depth slices between two successive ones of the light pulses.

13. The gated imaging system of claim 12, wherein each independent memory node is configured to pulse for a corresponding one of the depth slices between the two successive ones of the light pulses.

14. The gated imaging system of claim 12, wherein each depth slice storage circuit further comprises an independent network reset transistor coupled between the independent floating diffusion and a voltage source, wherein the independent network reset transistor is configured to reset the at least one independent memory node at an end of a readout period.

15. The gated imaging system of claim 12, wherein the independent sense node amplifier comprises a source follower transistor, wherein the independent floating diffusion is coupled to a gate terminal of the source follower transistor.

16. A method of operating a pixel circuit, the method comprising:

configuring a pulsed illuminator to generate a plurality of light pulses;

coupling a floating diffusion between (i) a photodiode configured to collect photogenerated image charge in response to image light and (ii) a sense node amplifier;

coupling a storage network between the photodiode and the floating diffusion, the storage network comprising:

a plurality of memory nodes coupled between the photodiode and the floating diffusion; and configuring the storage network to capture (i) a first plurality of depth slices between a first two successive ones of the light pulses and (ii) a second two successive ones of the light pulses, wherein the first plurality of depth slices includes a first number of depth slices, and wherein the second plurality of depth slices includes a second number of depth slices different from the first number.

17. The method of claim 16, further comprising:

configuring one or more of the memory nodes to pulse for a corresponding one of the depth slices between the first two successive ones of the light pulses.

18. The method of claim 16, further comprising:

configuring each of the memory nodes to pulse for a corresponding one of the depth slices between the first two successive ones of the light pulses.

19. The method of claim 16, wherein individual ones of the memory nodes comprise a transistor or a diode.

20. The method of claim 16, further comprising:

coupling a photodiode reset transistor between the photodiode and a voltage source; and configuring the photodiode reset transistor to reset the photodiode each time the storage network captures one of the depth slices.

21. The method of claim 16, further comprising coupling a network reset transistor between the storage network and a voltage source; and configuring the network reset transistor to reset the storage network at an end of a readout period.

22. The method of claim 16, further comprising:

coupling the pixel circuit to a readout circuit; and configuring the readout circuit to read out the depth slices after the storage network captures the depth slices between first two successive ones of the light pulses.

23. The method of claim 16, wherein:

a first timing of the first plurality of depth slices between the first two successive ones of the light pulses randomly differs from a second timing of the second plurality of depth slices between the second two successive ones of the light pulses;

the second number randomly differs from the first number; or a combination thereof.

24. The method of claim 16, wherein:

a first timing of the first plurality of depth slices between the first two successive ones of the light pulses differs linearly, exponentially, or in accordance with a first normal distribution from a second timing of the second plurality of depth slices between the second two successive ones of the light pulses in accordance;

the second number differs linearly, exponentially, or in accordance with a second normal distribution from the first number; or a combination thereof.

* * * * *